(12) United States Patent
Lam et al.

(10) Patent No.: US 10,712,577 B1
(45) Date of Patent: Jul. 14, 2020

(54) ELECTRONICALLY TUNABLE POLARIZING BEAM SPLITTER

(71) Applicant: Facebook Technologies, LLC, Menlo Park, CA (US)

(72) Inventors: Wai Sze Tiffany Lam, Redmond, WA (US); Yusufu Njoni Bamaxam Sulai, Bothell, WA (US); Robin Sharma, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 233 days.

(21) Appl. No.: 15/832,438

(22) Filed: Dec. 5, 2017

(51) Int. Cl.
| | | |
|---|---|---|
| G02B 27/28 | (2006.01) | |
| G02B 27/10 | (2006.01) | |
| G01J 3/02 | (2006.01) | |
| G02B 21/36 | (2006.01) | |

(52) U.S. Cl.
CPC .......... G02B 27/283 (2013.01); G01J 3/0224 (2013.01); G02B 21/361 (2013.01); G02B 27/10 (2013.01)

(58) Field of Classification Search
CPC .... G02B 27/28; G02B 27/281; G02B 27/283; G02B 27/285; G02B 27/286; G02B 27/10
See application file for complete search history.

(56) References Cited

U.S. PATENT DOCUMENTS

| | | | | |
|---|---|---|---|---|
| 2015/0248033 A1* | 9/2015 | Zhu | ..................... | G02F 1/13363 349/57 |
| 2015/0276582 A1* | 10/2015 | Skinner | ................ | G01N 21/314 356/365 |
| 2016/0048049 A1* | 2/2016 | Abdulhalim | ........ | G02F 1/13471 349/18 |
| 2018/0011239 A1* | 1/2018 | Yamaguchi | .......... | G02B 6/0055 |

* cited by examiner

*Primary Examiner* — William R Alexander
*Assistant Examiner* — Ephrem Z Mebrahtu
(74) *Attorney, Agent, or Firm* — Fenwick & West LLP

(57) ABSTRACT

A tunable polarizing beam splitter receives light, reflects a portion of the light that is linearly polarized in a first direction and transmits a second portion of the light that is linearly polarized in a second direction. The first and second polarization directions can be adjusted by controlling the fast axis of switchable liquid crystals (LCs) in the tunable polarizing beam splitter. The tunable polarizing beam splitter may include interlaced isotropic layers and LC birefringent layers, each LC birefringent layer including integrated switchable LCs. In another example, the tunable polarizing beam splitter includes switchable half wave plates (HWPs) with switchable LCs, and a static beam splitter including interlaced isotropic and birefringent layers.

8 Claims, 5 Drawing Sheets

ELECTRONICALLY TUNABLE POLARIZING BEAM SPLITTER

BACKGROUND

This invention relates generally to optical systems and specifically relates to a tunable polarizing beam splitter with adjustable linear polarization direction of output light.

Head-mounted displays (HMDs) may be used to present augmented and/or virtual information to a user. For example, a virtual reality (VR) headset can be used to simulate virtual environments. Conventionally, a HMD presents stereoscopic images on an electronic display inside the HMD to simulate the illusion of depth. However, conventional HMDs are often unable to compensate for vergence and accommodation conflict when rendering content, which may cause double vision, visual fatigue, and nausea in users.

SUMMARY

A tunable polarizing beam splitter receives light, reflects a portion of the light that is linearly polarized in a first direction and transmits a second portion of the light that is linearly polarized in a second direction. The first and second polarization directions can be adjusted by controlling the fast axis of switchable liquid crystals (LCs) in the tunable polarizing beam splitter. In some embodiments, the tunable polarizing beam splitter is part of an optical assembly (e.g., a multi-focal structure) of a head-mounted display (HMD) that presents images at multiple focal distances to correct vergence and accommodation conflict. For example, the optical assembly may output light at different focal distances based on the input linear polarization direction of light transmitted from the tunable polarizing beam splitter.

Some embodiments may include a tunable polarizing beam splitter, including a plurality of optical components positioned in series to receive light. The plurality of optical components include a plurality of isotropic layers, and a plurality of liquid crystal (LC) birefringent layers interlaced with the isotropic layers. Each LC birefringent layer includes switchable LCs forming an adjustable fast axis configured to rotate direction of polarization of the light. The plurality of optical components are configured to transmit a first portion of the light as first light that is linearly polarized in a first direction and reflect a second portion of the light as second light that is linearly polarized in a second direction orthogonal to the first direction. The first or second directions of linear polarization may be changed by adjusting the fast axis of the LC birefringent layers.

Some embodiments may include a tunable polarizing beam splitter including one or more switchable half wave plates (HWP) and a static beam splitter. The switchable HWP includes switchable liquid crystals (LCs) forming an adjustable fast axis configured to rotate direction of polarization of the light. The static beam splitter includes a plurality of isotropic layers, and a plurality of birefringent layers interlaced with the isotropic layers. The static beam splitter is configured to transmit a first portion of the light as first light linearly polarized in a first direction and reflect a second portion of the light as second light linearly polarized in a second direction. The first or second directions of linear polarization may be changed by adjusting the fast axis of the switchable HWP.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A tunable polarizing beam splitter receives light, reflects a portion of the light that is linearly polarized in a first direction and transmits a second portion of the light that is linearly polarized in a second direction. The first and second polarization directions can be adjusted by controlling the fast axis of switchable liquid crystals (LCs) in the tunable polarizing beam splitter. Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers. In some embodiments, the tunable polarizing beam splitter is part of an optical assembly (e.g., a multi-focal structure) of a HMD.

Figure 1:
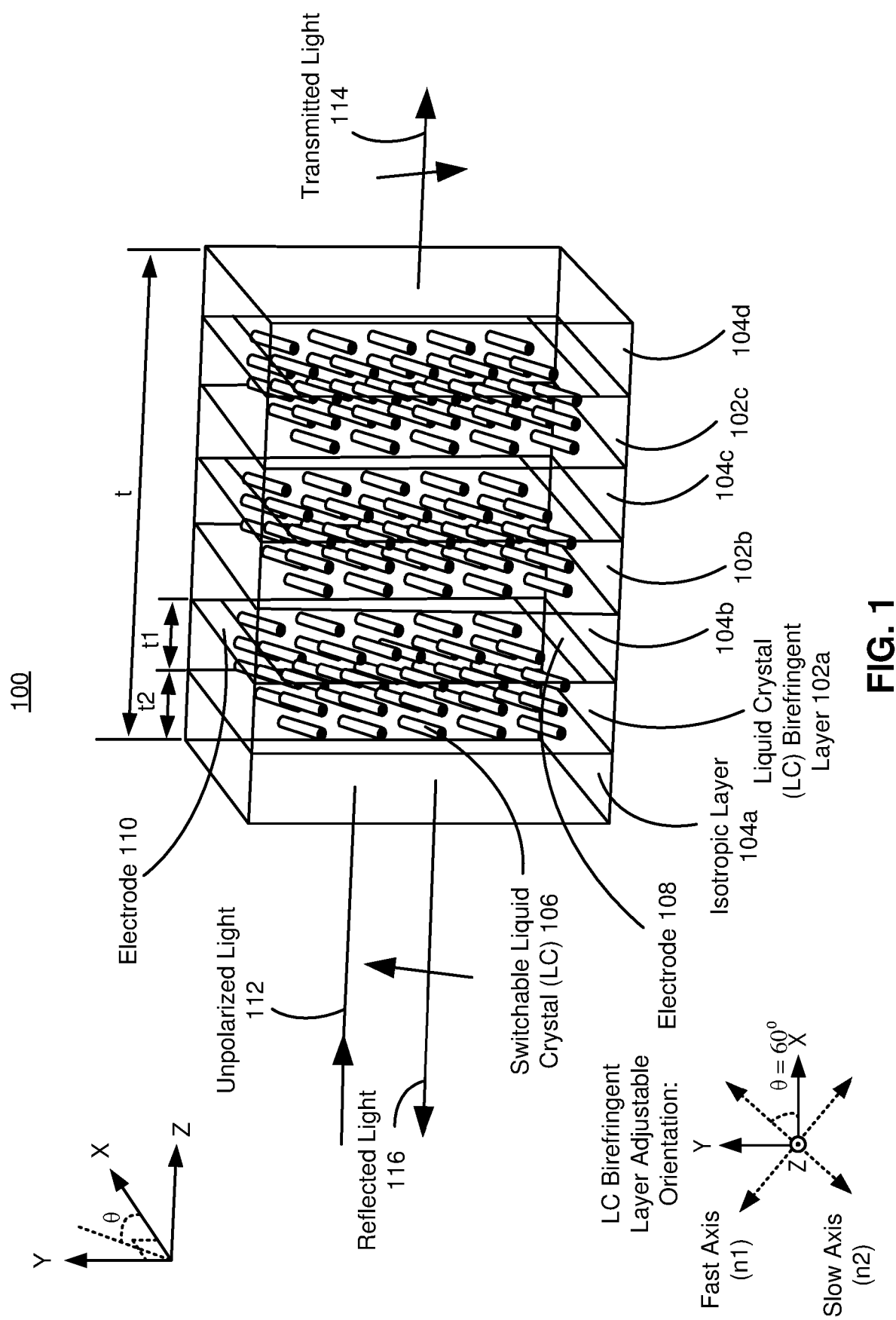
FIG. 1 shows a tunable polarizing beam splitter, according to one embodiment.

FIG. 1 shows a tunable polarizing beam splitter 100, according to one embodiment. The tunable polarizing beam splitter 100 (hereinafter also referred to as "polarizing beam splitter") receives light, transmits a portion of the light, and reflects a portion of the light. The transmitted and reflected light are linearly polarized in orthogonal directions, with the directions of polarization being adjustable by the polarizing beam splitter 100. Thus, the polarizing beam splitter 100 may receive input light, such as unpolarized input light, and transmit an output light that is linearly polarized along a selected direction.

The polarizing beam splitter 100 includes a series of optical elements including liquid crystal (LC) birefringent layers 102a, 102b, and 102c, and isotropic layers 104a, 104b, 104c, and 104d. The LC birefringent layers 102a-c are interlaced with the isotropic layers 104a-d, with each LC birefringent layer 102 between an isotropic layer 104. In other embodiments, the polarizing beam splitter 100 may include more or less layers.

Each isotropic layer 104a-d has a refractive index n1 for all polarizations of light. Each LC birefringent layer 102a-c has switchable liquid crystals (LCs) 106 that forms an adjustable fast axis with a refractive index of n1, and a corresponding adjustable slow axis with the refractive index of n2 defined orthogonal to the fast axis, where n1 is larger than n2. Each birefringent layer 102a-c further includes an electrode 108 and an electrode 110, with the switchable LCs 106 positioned between the electrodes 108 and 110. Responsive to a voltage being placed across the electrodes 108 and 110, the switchable LCs 106 rotate an amount based on the voltage level to change the orientation of the orthogonal fast and slow axes. The switchable LCs 106 and electrodes 108 and 110 form switchable half wave plates.

Each LC birefringent layer 102a-c has a thickness t1 defined by Equation 1:

$$n1 * t1 = \lambda/4 \quad (1)$$

where n1 is the refractive index of the fast axis of the LC birefringent layer 102 and $\lambda$ is the wavelength of light input to the polarizing beam splitter 100. Each isotropic layer 104 has a thickness t2 defined by Equation 2:

$$n2 * t2 = \lambda/4 \quad (2)$$

where n2 is the refractive index of the slow axis of the LC birefringent layers 102a-c and the refractive index of the isotropic layers 104a-d, and $\lambda$ is the wavelength of light input to the polarizing beam splitter 100. In some embodiments, the polarizing beam splitter 100 includes more than 20 layers formed from the LC birefringent layers and isotropic layers. The polarizing beam splitter 100 may include a total thickness t of between 2 and 20 micrometers (um), such as substantially 10 um. The extinction ratio or contrast of the polarizing beam splitter increases with number of layer, around 2 um for 30 layers and around 15 um for 200 layers. In some embodiments, t1 and t2 are each between 0.06 and 0.1 um.

Each LC birefringent layer 102a-c includes switchable liquid crystals (LCs) 106 that allow the fast and slow axes to be rotated to transmit output light that is linearly polarized along a selected direction. As shown in FIG. 1, the polarizing beam splitter 100 is positioned with the LC birefringent layers 102 and isotropic layers 104 aligned along a plane defined by an X-Y axis to receive unpolarized light 112 propagating along a Z axis. The polarizing beam splitter 100 transmits a portion of the unpolarized light 112 propagating along the Z axis as transmitted light 114, and reflects another portion of the unpolarized light 112 propagating in the opposite direction along the Z axis as reflected light 116. The reflected light 116 is an aggregate of reflected light portions at the interfaces of the isotropic layer and LC birefringent layers. The difference in refractive indices for light polarized along the slow axis between adjacent layers results in the light being partially reflected, resulting in the reflected light 116.

Responsive to voltage levels applied across the electrodes 108 and 110, the switchable LCs 106 rotate in the plane defined by the X-Y axes, thereby rotating the in-plane fast and slow axes of the LC birefringent layer 102. If the switchable LCs 106 are oriented at an angle $\theta$ defined from the X axis and in the X-Y plane, this results in the fast axis with refractive index n1 being oriented along the angle $\theta$, and the low axis with refractive index n2 being oriented along an orthogonal angle $\theta+90°$. As a result, the transmitted light 114 is linearly polarized along the slow axis defined by $\theta+90°$, and the reflected light 116 is linearly polarized along the fast axis defined by $\theta$. In the example shown in FIG. 1, the switchable LCs 106 are oriented at an angle $\theta=60°$ in the direction of propagation along the Z-axis, which causes the fast axis of the LC birefringent layer 102 to be along 60°, the reflected light 116 to be linearly polarized along 60°. Furthermore, the slow axis of the LC birefringent layer 104 is along 150° (e.g., 60+90), and the transmitted light 114 to be linearly polarized along 60°. Thus, by adjusting the orientation of the switchable LCs 106 using the voltage across the electrodes 108 and 110, the unpolarized input light 112 is transformed into the transmitted light 114 and reflected light 116, each linearly polarized in adjustable, orthogonal directions. In some embodiments, the switchable LCs 106 rotate in the plane defined by the X-Y axes between $\theta=0°$ and 90° between a minimum and maximum applied voltage across the electrodes 108 and 110, thereby rotating the in-plane fast and slow axes of the LC birefringent layer 102 between $\theta=0°$ and 90°, and rotating the directions of linearly polarized transmitted light 114 and reflected light 116 between $\theta=0°$ and 90°.

Figure 2:
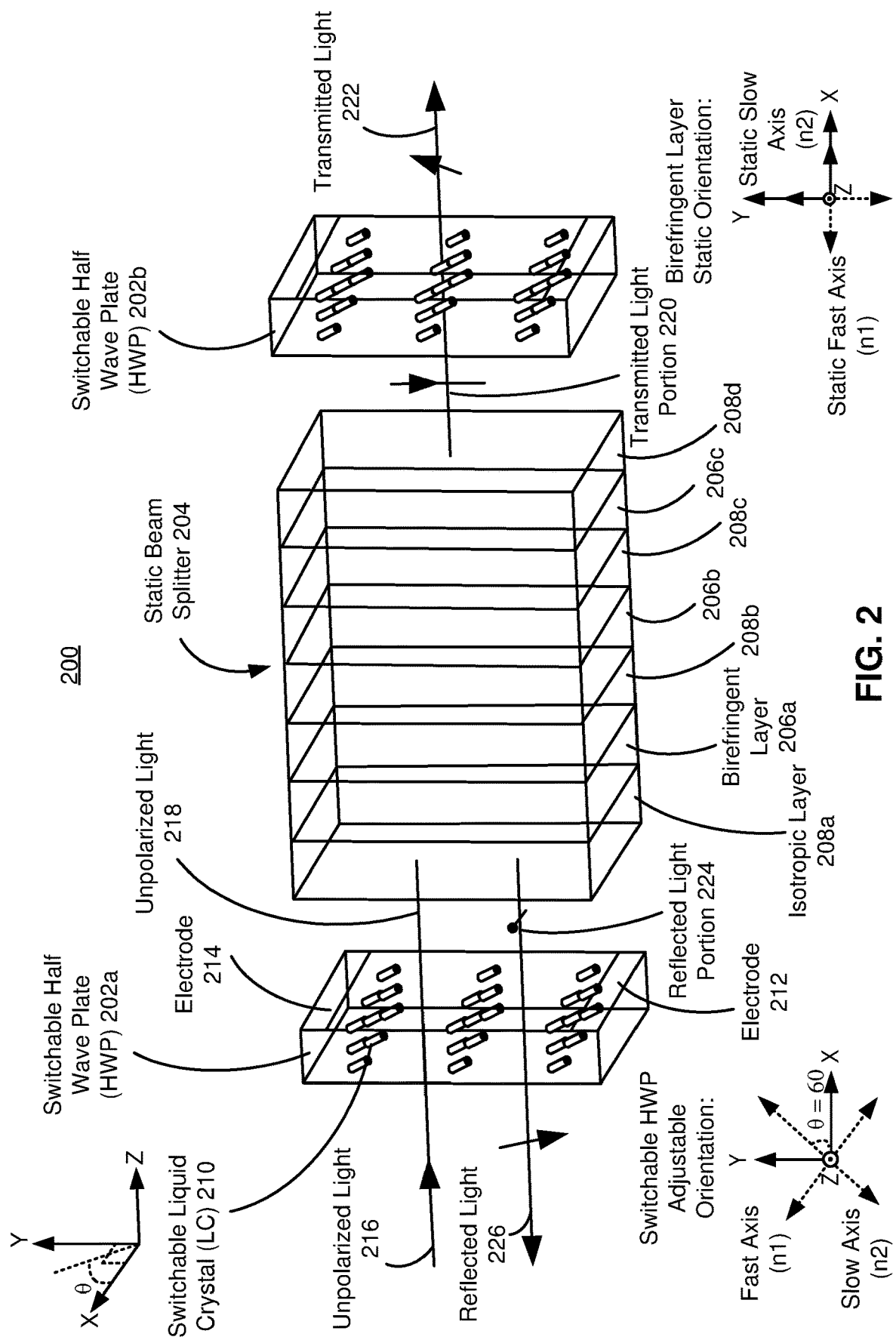
FIG. 2 shows another embodiment of a tunable polarizing beam splitter, according to one embodiment.

FIG. 2 shows another embodiment of a tunable polarizing beam splitter 200, according to one embodiment. Similar to the polarizing beam splitter 100, the tunable polarizing beam splitter 200 (hereinafter also referred to as "polarizing beam splitter") receives light, transmits a portion of the light, and reflects a portion of the light. The transmitted and reflected light are linearly polarized in orthogonal directions, with the directions of polarization being adjustable by the polarizing beam splitter 200.

The polarizing beam splitter 200 includes a series of optical elements including a switchable half wave plate (HWP) 202a, a static beam splitter 204, and a switchable HWP 202b. In some embodiments, one of the switchable HWP 202a or 202b may be omitted.

The switchable HWPs 202a and 202b, hereinafter also referred to as switchable HWP 202, each includes switchable LCs 210, an electrode 212, and an electrode 214. The switchable LCs 210 are positioned between the electrodes 212 and 214. Responsive to a voltage being placed across the electrodes 212 and 214, the switchable LCs 210 rotate an amount based on the voltage level to change the orientation of the orthogonal fast and slow axes. The switchable LCs 210 forms an adjustable fast axis with a refractive index of n1, and a corresponding adjustable slow axis with a refractive index of n2 defined orthogonal to the fast axis, where n1 is larger than n2. Each switchable HWP 202 may have a thickness t1 as defined by Equation 1. For example, the switchable HWP 202 may be characterized by birefringence of the LC ($\Delta n$) and the LC cell thickness t1. LC birefringence ranges from 0.1 to 0.2. Thus, the thickness t1 may range from 1 to 3 um. The static beam splitter 204 includes birefringent layers 206a, 206b, and 206c, and isotropic layers 208a, 208b, 208c, and 208d. The birefringent layers 206a-c are interlaced with the isotropic layers 208a-d, with each birefringent layer 206a-c between an isotropic layer 208a-d. In other embodiments, the static beam splitter 204 may include more or less layers. Each isotropic layer 208a-d has a refractive index n1 for all polarizations of light. Each birefringent layer 206a-c has a static fast axis with a refractive index of n1, and a corresponding static slow axis with the refractive index of n2 defined orthogonal to the static fast axis, where n1 is larger than n2. The static fast and slow axes of the birefringent layers 206a-c define the fast and slow axes of the static beam splitter 204. In the example shown in FIG. 2, the static fast axis of each birefringent layer 206a-c is aligned along the Y-axis and the static slow axis is aligned along the X-axis. In some embodiments, each birefringent layer 206a-c has the thickness t1 defined by Equation 1, and each isotropic layer 208a-d has the thickness t2 defined by Equation 2. In some embodiments, the polarizing beam splitter 200 may include a total thickness t of between 2 and 20 micrometers (um) depending on the number of layers. For example, the polarizing beam splitter 200 may be around 2 um for 30 layers and around 15 um for 200 layers. In some embodiments, t1 and t2 are between 0.06 and 0.1 um.

In some embodiments, the switchable HWP 202 has an average refractive index of about 1.5, with n1 and n2 ranges between 1.35 and 1.7. The birefringence of the LC (delta_n=|n1−n2|) ranges from 0.1 to 0.2. The birefringent layer 206 has refractive index (n1 and n2) ranges from 1.4 to 1.65 with birefringence ranges from 0.05 to 0.25. The isotropic layer 208 has refractive index around 1.5 (can range from 1.4 to 1.65)

The adjustable fast and slow axes of the switchable HWPs 202a and 202b may be adjusted relative to the static fast and slow axes of the static beam splitter 204 to control the polarization direction of linearly polarized transmitted light 222 and linearly polarized reflected light 226. Responsive to voltage levels applied across the electrodes 212 and 214, the switchable liquid crystals (LCs) 210 of each HWP 202 rotate in the plane defined by the X-Y axes, thereby rotating the in-plane fast and slow axes of the HWP 202. The static fast and slow axes of the static beam splitter 204 do not change, and thus the fast and slow axes of the HWP 202 can be adjusted relative to the static fast and slow axes of the static beam splitter 204.

As shown in FIG. 2, the polarizing beam splitter 100 is positioned with the switchable HWP 202a, birefringent layers 206, isotropic layers 208, and switchable HWP 202b aligned along a plane defined by an X-Y axis to receive unpolarized light 216 propagating along a Z axis. The unpolarized light 216 is transmitted through the switchable HWP 202a as unpolarized light 218. The unpolarized light 216 includes light components aligned in many directions, including portions of light aligned with the fast axis of the static beam splitter 204 (e.g., along the X-axis) and other portions of the light aligned along the orthogonal slow axis of the static beam splitter 204 (e.g., along the Y-axis). The static beam splitter 204 transmits a portion of the unpolarized light 218 propagating along the Z axis as transmitted light portion 220, and reflects another portion of the unpolarized light 218 propagating in the opposite direction along the Z axis as reflected light portion 224. In particular, the reflected light portion 224 is an aggregate of light reflected from the interfaces between adjacent isotropic layers 208a-d and birefringent layers 206a-c. The transmitted light portion 220 is linearly polarized along the static slow axis of the static beam splitter 204, and the reflected light portion 224 is linearly polarized along the static fast axis of the static beam splitter 204. The transmitted light portion 220 is received by the switchable HWP 202b, and transmitted by the HWP 202b as transmitted light 222 that is linearly polarized in a selected direction. The reflected light portion 224 is received by the switchable HWP 202b, and transmitted by the HWP 202a as reflected light 226 that is linearly polarized in a direction orthogonal to the polarization direction of the transmitted light 222.

If the switchable HWP 202a and 202b have switchable LCs aligned along an (X, Y) unit vector of (cos(θ/2), sin(θ/2)), then the transmitted light portion 220 is linearly polarized along (0, 1)

In the example shown in FIG. 2, the static fast axis of the static beam splitter 204 is oriented at an angle θ=0°, which causes the reflected light portion 224 to be linearly polarized along 0°, and the transmitted light portion 220 to be linearly polarized along 90°.

In the example shown in FIG. 2, the switchable LCs 210 of the switchable HWP 202b are oriented at an angle θ=60°, which causes the fast axis of the switchable LCs 210 to be aligned along θ=60°, and the slow axis of the switchable LCs 210 to be aligned along 150°. As such, the switchable HWP 202b rotates the polarization direction of the transmitted light portion 220 resulting in the transmitted light 22 being linearly polarized along θ=30°.

In the example shown in FIG. 2, the switchable LCs 210 of the switchable HWP 202a are oriented at an angle θ=60° as defined in the direction of light propagation (e.g., aligned with the switchable LCs 210 of the switchable HWP 202b), which causes the fast axis of the switchable LCs 210 of the switchable HWP 202a to be aligned along θ=60°, and the slow axis of the switchable LCs 210 of the switchable HWP 202a to be aligned along 150°. As such, the switchable HWP 202a rotates the polarization direction of the reflected light portion 224 to be aligned along θ=120° in the direction of propagation.

The polarizing beam splitter 200 is slightly thicker than the polarizing beam splitter 100 shown in FIG. 1. The total thickness of polarizing beam splitter 200 ranges from 5 um to 26 um. However, unlike the multiple LC birefringent layers (e.g., 10 layers or more) of the polarizing beam splitter 100 which each include switchable LCs, only the switchable HWPs 202a and 202b of the polarizing beam splitter 200 includes switchable LCs, resulting in a simpler design. Furthermore, the polarizing beam splitter 200 includes fewer switchable half wave plates and electrode connections relative to polarizing beam splitter 100.

Figure 3A:
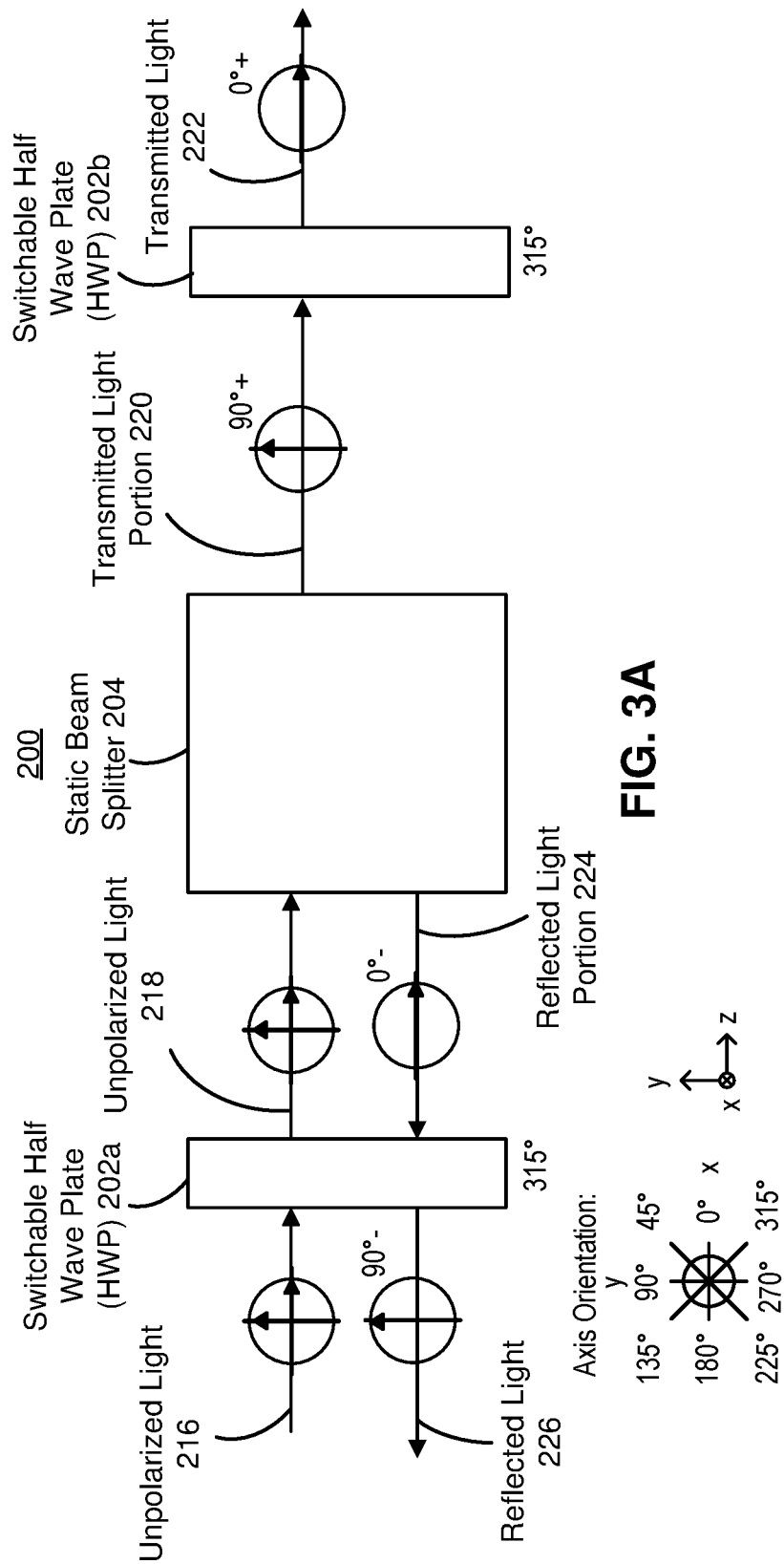
FIG. 3A shows propagation of light through the polarizing beam splitter, according to one embodiment.

FIG. 3A shows propagation of light through the polarizing beam splitter 200, according to one embodiment. In particular, the switchable fast axes of the switchable HWP 202a and HWP 202b are oriented along θ=315° (or −45°) with reference to the positive Z-axis. As discussed above, a portion of the unpolarized light 216 is transmitted as transmitted light 222 and another portion of the unpolarized light 216 is reflected by the polarizing beam splitter 200 as reflected light 226.

The unpolarized light 216 is transmitted through the switchable HWP 202a as the unpolarized light 218. The beam splitter 204 receives the light 218 and transmits the transmitted light portion 220, linearly polarized along θ=90° in direction of the positive Z-axis. The transmitted light portion 220 is then rotated by the switchable HWP 202b according to the offset between the polarization direction of the transmitted light portion 220 and the fast axis of the HWP 202b. The switchable fast axis of the HWP 202b is set to θ=315°, thus resulting in the transmitted light 222 being linearly polarized along θ=0°.

The beam splitter 204 reflects the reflected light portion 224 in the direction of the negative Z-axis, linearly polarized along θ=0°. The reflected light portion 224 is then rotated by the switchable HWP 202a according to the offset between the polarization direction of the reflected light portion 224 and the fast axis of the HWP 202a. The switchable fast axis of the HWP 202a is set to θ=315° (or 45° with reference to the direction of light propagation), thus resulting in the reflected light 226 being linearly polarized along θ=90°.

Figure 3B:
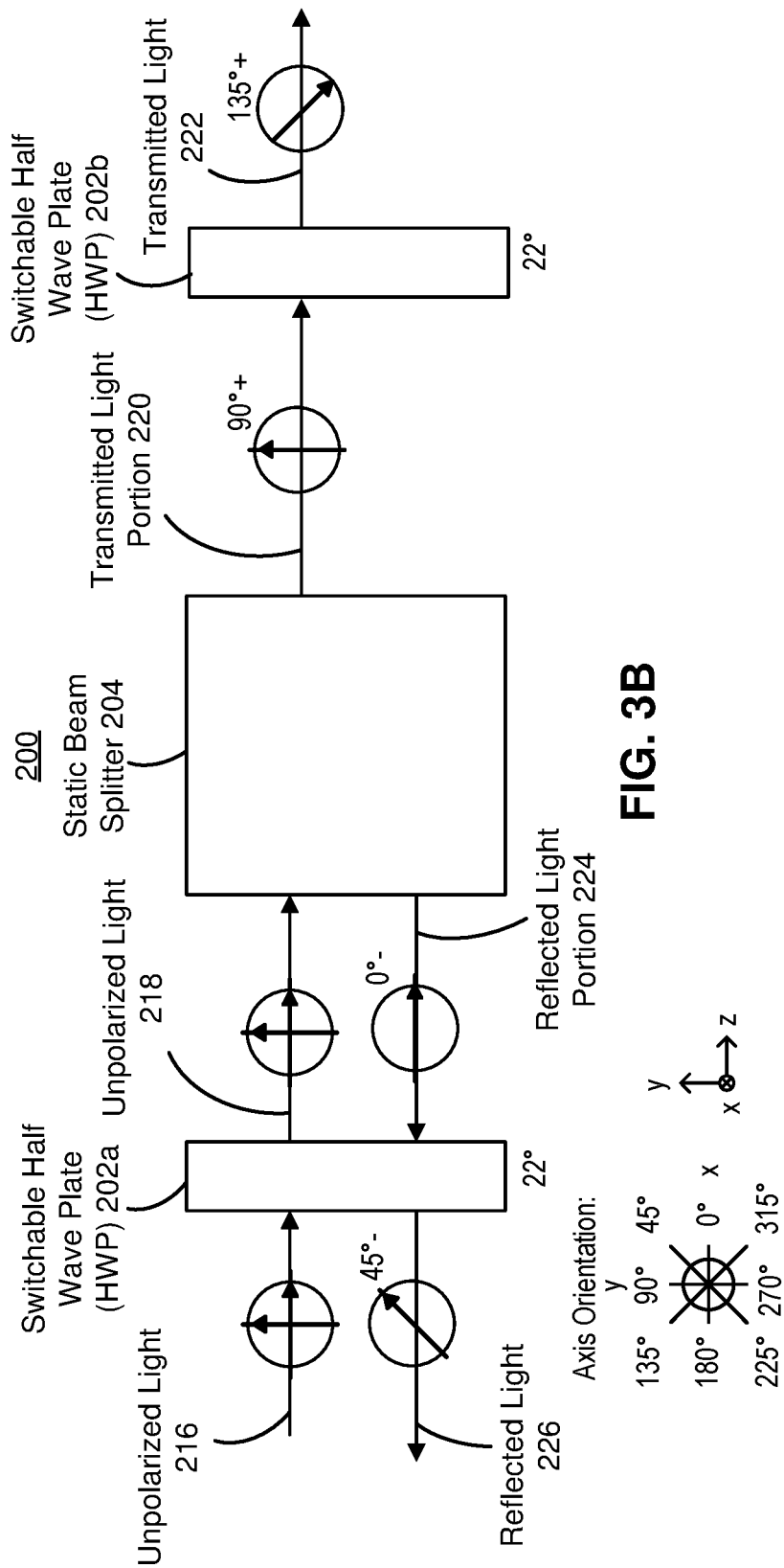
FIG. 3B shows propagation of light through the polarizing beam splitter, according to one embodiment.

FIG. 3B shows propagation of light through the polarizing beam splitter 200, according to one embodiment. In particular, the switchable fast axes of the switchable HWP 202a and HWP 202b are oriented along θ=22.5° with reference to the positive Z-axis.

The unpolarized light 216 is transmitted through the switchable HWP 202a as the unpolarized light 218. The beam splitter 204 receives the light 218 and transmits the transmitted light portion 220, linearly polarized along θ=90° in direction of the positive Z-axis. The transmitted light portion 220 is then rotated by the switchable HWP 202b according to the offset between the polarization direction of the transmitted light portion 220 and the fast axis of the HWP 202b. The switchable fast axis of the HWP 202b is set to θ=22.5°, thus resulting in the transmitted light 222 being linearly polarized along θ=135°.

The beam splitter 204 reflects the reflected light portion 224 in the direction of the negative Z-axis, linearly polarized along θ=0°. The reflected light portion 224 is then rotated by the switchable HWP 202a according to the offset between the polarization direction of the reflected light portion 224 and the fast axis of the HWP 202a. The switchable fast axis of the HWP 202a is set to θ=22.5°, thus resulting in the reflected light 226 being linearly polarized along θ=45°.

Figure 4A:
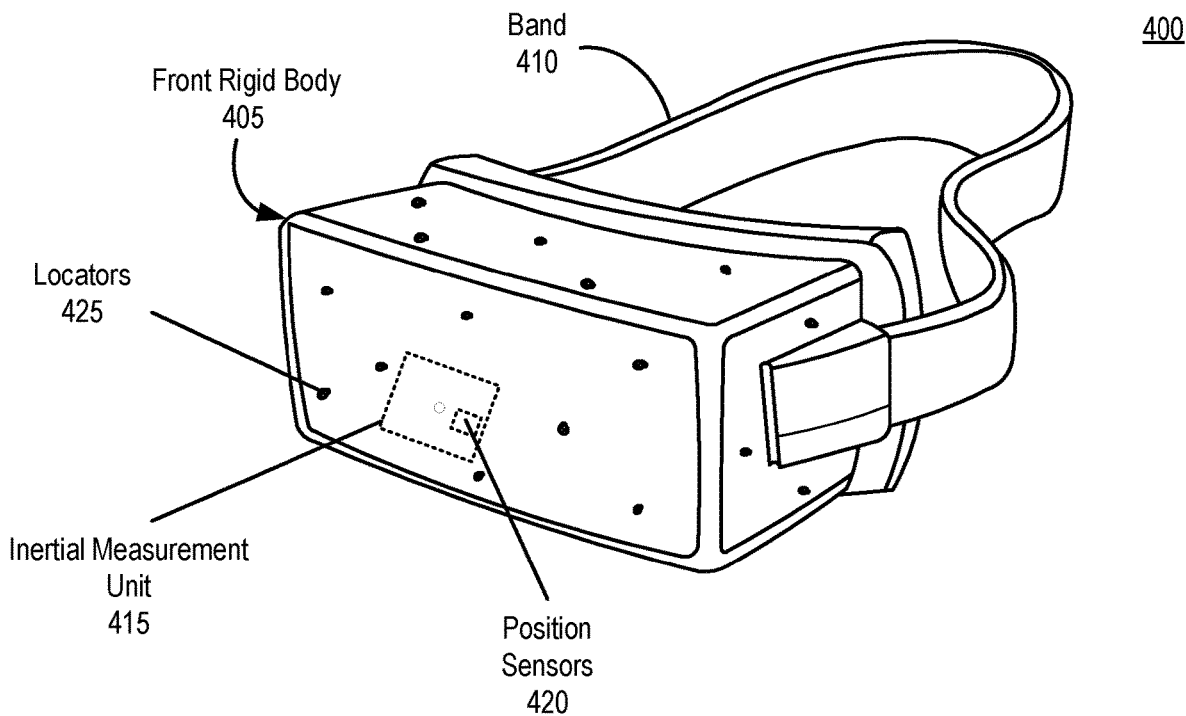
FIG. 4A shows a wire diagram of a head mounted display (HMD), according to one embodiment.

FIG. 4A is a wire diagram of a head mounted display (HMD) 400, according to one embodiment. The HMD 400 includes a front rigid body 405 and a band 410. In some embodiments, portions of the HMD 400 may be at least partially transparent (e.g., if the HMD 400 is part of an AR or MR system). For example, portions of the front side 406 and intervening components (e.g., electronic display) between the front side 406 and an eye of a user may be transparent. The front rigid body 405 includes other components of the HMD 400, such as the inertial measurement unit 415, position sensors 420, and locators 425, which are components that may be used for user head position tracking.

Figure 4B:
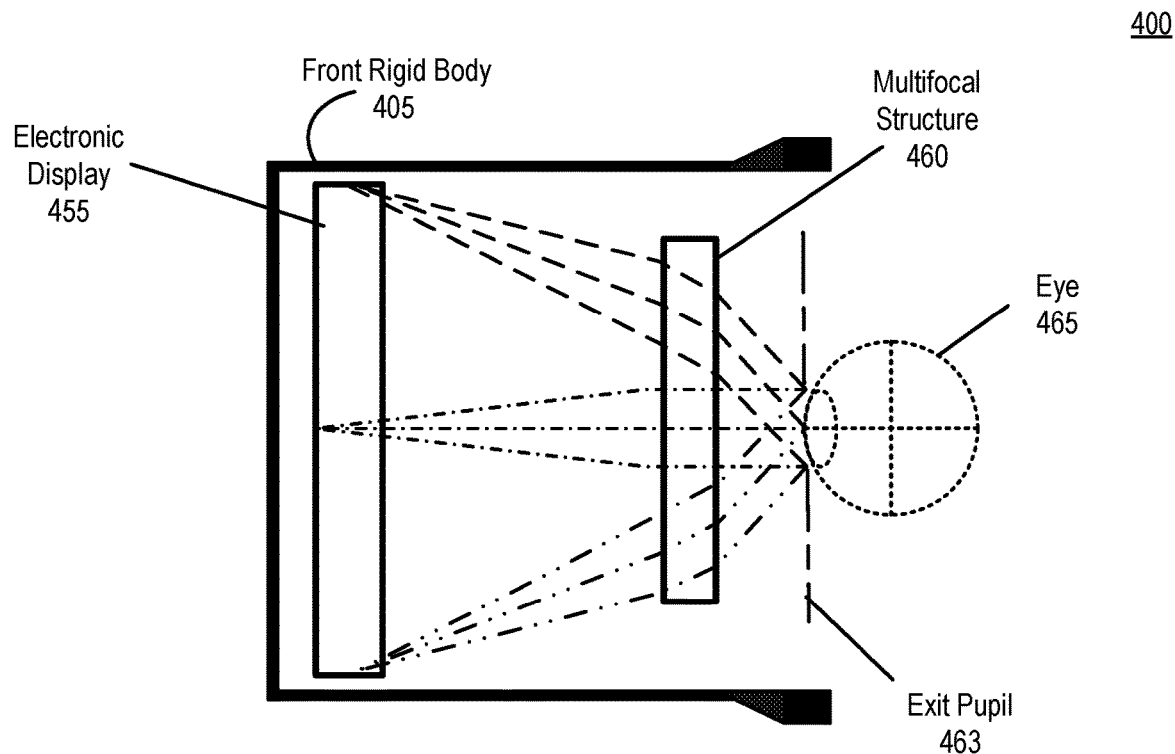
FIG. 4B shows a cross section of a front rigid body of the HMD shown in FIG. 4A, according to one embodiment.

FIG. 4B is a cross section of the front rigid body 405 of the embodiment of the HMD 400 shown in FIG. 4A. As shown in FIG. 4B, the front rigid body 405 includes an electronic display 455 and a multifocal structure 460 that together provide image light to an exit pupil 463. The exit pupil 463 is the location of the front rigid body 405 where a user's eye 465 is positioned. For purposes of illustration, FIG. 4B shows a cross section associated with a single eye 465, but another optics block, separate from the multifocal structure 460, may provide altered image light to another eye of the user.

The electronic display 455 displays images to the user. In various embodiments, the electronic display 455 may include a single electronic display or multiple electronic displays (e.g., a display for each eye of a user). Examples of the electronic display 455 include: a liquid crystal display (LCD), an organic light emitting diode (OLED) display, an active-matrix organic light-emitting diode display (AMOLED), a QOLED, a QLED, a micro-LED display, a vertical-cavity surface-emitting laser (VCSEL) display, some other display, or some combination thereof.

The multifocal structure 460 adjusts an orientation of light emitted from the electronic display 455 such that it appears at one or more particular focal distances from the user. The multifocal structure 460 includes a plurality of optical components such as, for example, polarizers, lenses, waveplates, or any other suitable optical component that affects the image light emitted from the electronic display 455. In some embodiments, the multifocal structure 460 includes a polarizing beam splitter, such as the polarizing beam splitter 100 or 200. The polarizing beam splitter receives light from the electronic display 455, and transmits a portion of the light from the electronic display 455 as light that is linearly polarized in a selected direction. The transmitted light may be provided to other optical components of the multifocal structure 460, such as a pancake lens structure.

Moreover, a multifocal structure 460 may include combinations of different optical components. In some embodiments, one or more of the optical components in the multifocal structure 460 may have one or more coatings, such as anti-reflective coatings. A liquid crystal lens can provide different optical power adjustments for light emitted from the electronic display 455, and partially reflective surfaces created a folded optics system that provides a polarization dependent path (e.g. direct or folded) for the light emitted from the electronic display 455. Using different combinations of optical power and optical path configurations, the light emitted from pixels of the electronic display 455 can be placed at one or multiple different focal distances.

The multifocal structure 460 adjusts the focal distance by adjusting the length of the optical path of light (path length) emitted from the electronic display 455. Each focal distance corresponds to a respective focal plane, and each focal plane is associated with a respective path length of image light that propagates from the electronic display 455 to the exit pupil 463. The multifocal structure 460 varies the path length of the image light, and thus the focal planes, by varying a number of reflections the image light undergoes in the multifocal structure 460. A larger number of reflections increases the path length and, accordingly, presents a focal plane further away from the user. Likewise, a smaller number of reflections decrease the path length and, accordingly, presents a focal plane close to the user. The location of the focal planes also depends on focal lengths of the optical components within the optical path.

Additionally, in some embodiments, the multifocal structure 460 magnifies received light, corrects optical errors (e.g., field curvature, chromatic aberration, etc.) associated with the image light, and presents the corrected image light to a user of the HMD 400. Additional details regarding the multifocal structure 460, applicable in some embodiments, are discussed in U.S. patent Ser. No. 15/471,961, titled "Multifocal System Using Pixel Level Polarization Controllers and Folded Optics," filed Mar. 28, 2017, which is incorporated by reference herein in its entirety.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A tunable polarizing beam splitter, comprising:
    a plurality of optical components positioned in series to receive light, the plurality of optical components including:
        a plurality of isotropic layers including an isotropic layer that has a refractive index n1; and
        a plurality of liquid crystal (LC) birefringent layers interlaced with the isotropic layers, each LC birefringent layer including switchable LCs forming an adjustable fast axis configured to rotate direction of polarization of the light, the plurality of LC birefringent layers including an LC birefringent layer having the refractive index n1 for the adjustable fast axis and a refractive index n2 for an adjustable slow axis orthogonal to the adjustable fast axis, n1 being larger than n2, the plurality of optical components configured to transmit a first portion of the light as first light that is linearly polarized in a first direction and reflect a second portion of the light as second light that is linearly polarized in a second direction orthogonal to the first direction.

2. The tunable polarizing beam splitter of claim 1, wherein:
    the LC birefringent layer has a thickness t1, where $n1*t1=\lambda/4$;
    the isotropic layer has a thickness t2, where $n2*t2=\lambda/4$; and
    $\lambda$ is the wavelength of the input light.

3. The tunable polarizing beam splitter of claim 1, wherein the light is received by the plurality of optical components as unpolarized light.

4. The tunable polarizing beam splitter of claim 1, wherein the plurality of optical components includes a thickness of between 2 and 20 micrometers.

5. The tunable polarizing beam splitter of claim 1, wherein:
    the LC birefringent layer including a first electrode and a second electrode, the switchable LCs of the LC birefringent layer positioned between the first electrode and the second electrode;
    the switchable LCs of the LC birefringent layer are configured to adjust the fast axis of the LC birefringent layer according to a voltage applied to the switchable LCs via the first electrode and the second electrode; and
    adjusting the fast axis of the LC birefringent layer changes the first direction of the first light and the second direction of the second light.

6. The tunable polarizing beam splitter of claim 5, wherein the switchable LCs of the LC birefringent layer are configured to rotate in response to the voltage to adjust the fast axis.

7. A tunable polarizing beam splitter comprising:
    a plurality of optical components positioned in series to receive light, the plurality of optical components including:
        a plurality of isotropic layers; and
        a plurality of liquid crystal (LC) birefringent layers interlaced with the isotropic layers, each LC birefringent layer including switchable LCs forming an adjustable fast axis configured to rotate direction of polarization of the light, the plurality of optical components configured to transmit a first portion of the light as first light that is linearly polarized in a first direction and reflect a second portion of the light as second light that is linearly polarized in a second direction orthogonal to the first direction, wherein the first direction of the first light is aligned orthogonal to the adjustable fast axis and the second direction of the second light is aligned with the adjustable fast axis.

8. The tunable polarizing beam splitter of claim 1, wherein the optical components include at least 20 total layers including the plurality of isotropic layers and the plurality of LC birefringent layers.

* * * * *